METHOD OF AND POWER SUPPLY FOR ELECTRIC ARC WELDING
Filed July 10, 1967 2 Sheets-Sheet 1
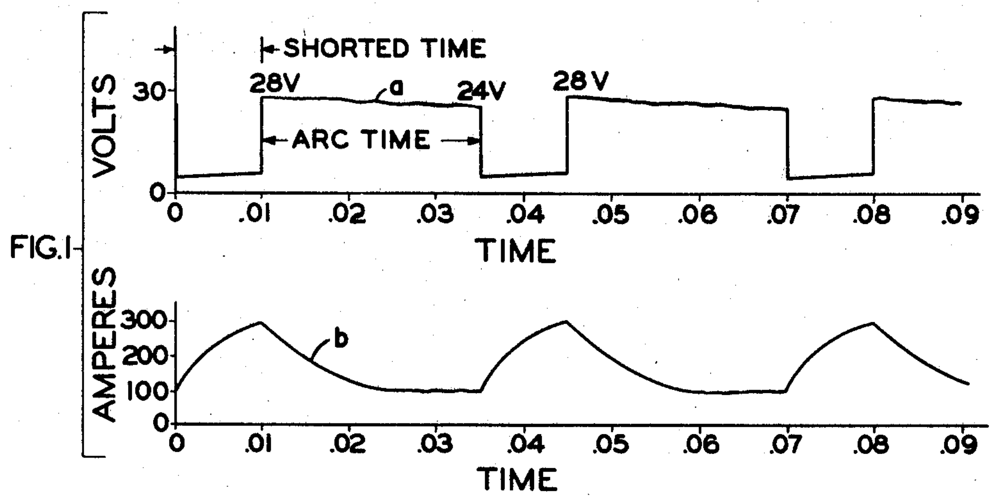
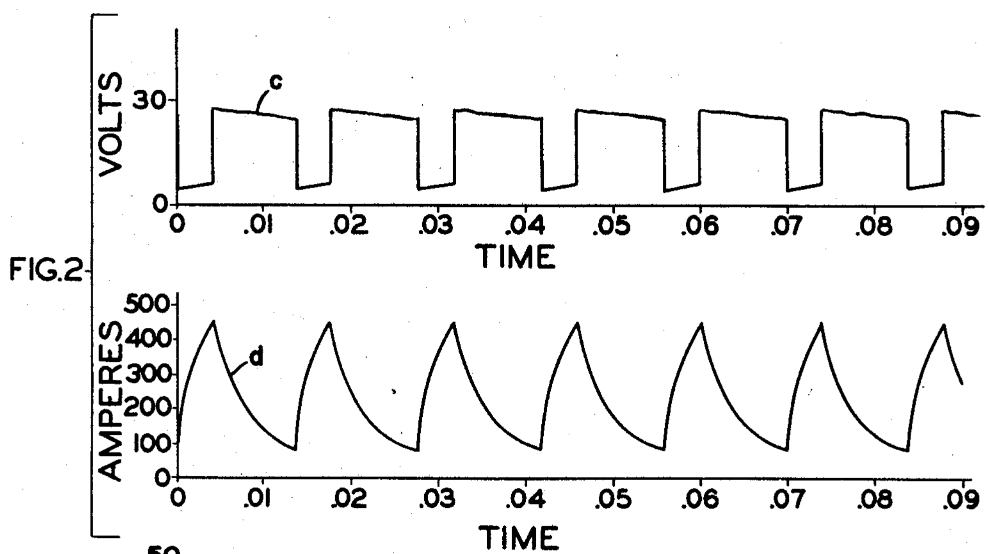
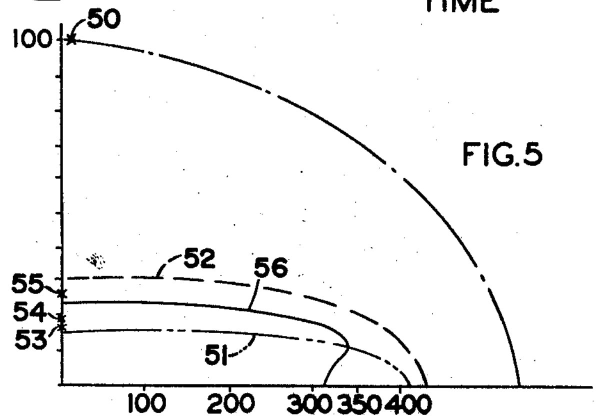
INVENTORS
JON D. McCOLLISTER
JOHN E. CARROLL
BY
Meyer, Tilberry & Body
ATTORNEYS.

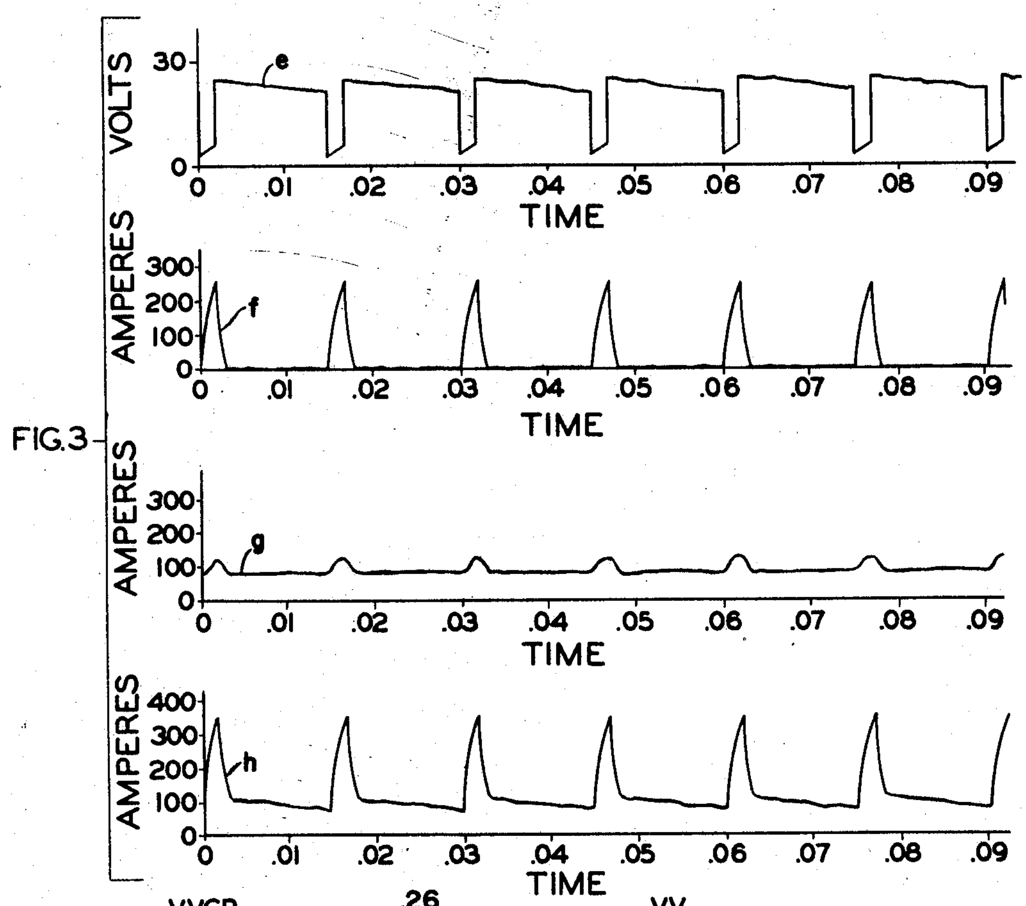
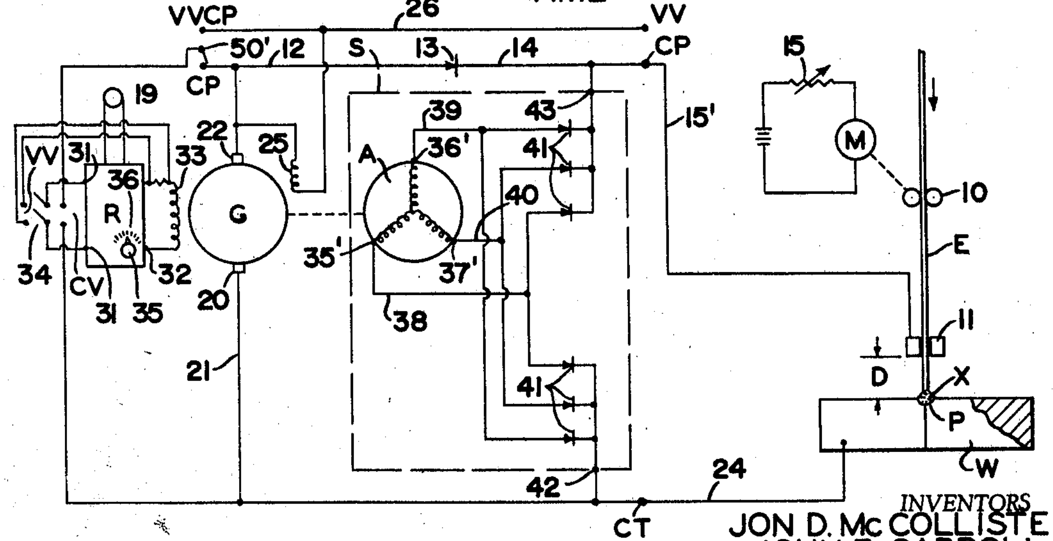
FIG.4
INVENTORS
JON D. Mc COLLISTER
JOHN E. CARROLL
BY
Meyer, Tilberry & Body
ATTORNEYS.

United States Patent Office 3,502,897
Patented Mar. 24, 1970

3,502,897
METHOD OF AND POWER SUPPLY FOR ELECTRIC ARC WELDING

Jon D. McCollister, Mentor, and John E. Carroll, Lyndhurst, Ohio, assignors to The Lincoln Electric Company, Cleveland, Ohio, a corporation of Ohio Filed July 10, 1967, Ser. No. 652,204
Int. Cl. H02j 7/34; H05b 1/00; H02p 9/10
U.S. Cl. 307—52 10 Claims

ABSTRACT OF THE DISCLOSURE

Electric arc power supply for automatic arc welding of the drop transfer type with a small diameter electrode comprising a principal and a supplementary DC power source in parallel wherein the principal power source has a short circuit rate of current rise less than 60,000 amperes per second and the supplementary power supply has a short circuit rate of current rise greater than 60,000 amperes per second. The principal source supplies current at all times. The supplementary source furnishes no current during arcing but when the drop contacts the weld pool and short circuits the power supply, the supplementary source supplies a brief pulse of current sufficient to very rapidly break the short circuit and reestablish the arc.

This invention pertains to the art of electric arc welding and, more particularly, to a method of electric arc welding, and a power supply for carrying out such method.

The invention is particularly applicable to out-of-position automatic and semi-automatic electric arc welding of metals using relatively small diameter electrodes, and will be described with particular reference thereto, although it will be appreciated that the invention has other and broader applications.

By "automatic welding" is meant feeding a welding electrode of indefinite length past an electric contact forming part of a welding head toward the workpiece to be welded. The contact is usually spaced anywhere from ¼ inch to 1¾ inch from the workpiece although it can be more. The portion between the contact and the electrode end is referred to herein as the "electrode extension." The electrode may have any diameter but the invention is primarily applicable to electrodes having a current carrying cross-section between .0005 square inch and .0050 square inch; either cored electrode or solid electrode.

By "out-of-position welding" is meant welding in other than the downhand position, e.g. either vertical or overhead. Such welding presents a problem in that the weld pool must remain rather small and not be heated too much above the melting temperature of the metal of the workpiece. If it is, the molten metal becomes too liquid and runs out of the weld pool. Furthermore, some means other than gravity must be employed to move the metal from the electrode end to the molten weld pool.

The invention is usable with either cored or solid electrodes. The protection of the weld resulting from the melting and vaporization of the core, coating or granular flux; gas shielding either $CO_2$, inert gas, or mixtures of inert and active gases, do not diminish the effectiveness of the invention.

Background

In the art of arc welding, metal is transferred from the electrode to the workpiece by one of two general mechanisms. The first is when a molten droplet forms on the end of the electrode, breaks off and transfers by free flight from the electrode end to the workpiece. This is called "spray transfer." Spray transfer is usually characterized by a continuous high current sufficient to pinch off the molten droplets on the electrode end as rapidly as they are formed. This high arc current is unsatisfactory for out-of-position welding because the high heat generated by the arc makes the weld pool too hot and thus too liquid. Also in out-of-position welding, transfer of the metal from the electrode to the weld pool is inefficient. The other mechanism is where the molten droplet forms on the end of the electrode, contacts the weld pool, breaks off and is drawn into the weld pool by the surface tension of the molten metals. This is called "drop transfer." The present invention deals with this drop transfer mode of metal transfer to the molten weld pool.

The drop transfer method creates certain problems because at the instant the droplet contacts the weld pool, a short circuit is made across the power source which continues until the droplet is separated from the electrode. High speed movies indicate that during this moment the arc goes out. When the droplet breaks away, the arc is re-established and the sequence repeats itself.

High speed oscillograms using a constant voltage power source reveal that the instantaneous currents and voltages are quite different from that shown by the typical d'Arsonval ammeter or voltmeter. These oscillograms indicate that while there is an arc, the current is on the order of 80 to 100 amperes and the heat from the arc melts both the workpiece to form the weld pool and the electrode end to form the molten droplet. When the droplet touches the weld pool, the resultant short circuit causes the voltage across the arc to instantaneously drop to zero and the current rises exponentially to a much higher value determined by the parameters of the welding circuit. This current rapidly heats both the droplet and the electrode extension until finally some portion of this droplet or the extension breaks away like a fuse at which time the arc gap is reestablished. The minimum current at which this fuse break occurs is, of course, dependent somewhat on the current carrying area of the electrode, being on the order of 300 amperes for an area on the order of .0008 square inches and somewhat greater for an electrode having a current carrying area in the order of .005 square inch. The current now falls exponentially toward a value determined by the rate of wire feed and other parameters of the circuit. These oscillograms also show that the rapid drop in current when the arc gap is reestablished generates a voltage in the inductance of the power source which voltage is additive to the power source open circuit voltage and appears across the new arc gap. This "inductive voltage," being generated by the rate of change of the current, also decays exponentially with the decay in the current in the arc gap.

The short circuit rate of rise of the current, the maximum current which is reached before the arc is reestablished, and the rate of decay of the current when the arc gap is reestablished all have a substantial effect on the ability to obtain satisfactory welds under varying conditions and particularly in out-of-position.

If the rate of rise of the current when the droplet shorts to the weld pool is relatively low, then during the time required for the current to rise to a value necessary to cause the fuse break, the electrode extension also has time to heat and the break may occur in this extension rather than in the molten droplet. When the break occurs in the extension, the new end of the electrode is removed further from the weld pool than it would have been if the break had occurred in the droplet and a longer time is required for the next short circuit to occur. Also, this longer time results in the molten droplet that forms on the end of this advancing electrode being much larger than it would have been if the break had occurred closer to the weld pool. Also, the arcing time is increased resulting in a higher heat input to the weld pool.

It can be noted at this point that this problem of a low rate of rise only exists with the small diameter electrodes as used in semi-automatic welding. With stick welding the electrode diameter is substantially greater and is much more able to carry the short circuit current without the fuse break occurring in the electrode wire itself.

If the maximum current is too high, then when the fuse break occurs, it does so with an explosive effect, sometimes sufficient to blast the molten metal out of the weld pool, but, in any event, creating spatter which is not only wasteful of valuable weld metal but is unsightly and difficult to clean up. Also, a high maximum current results in a higher average current during the arcing period.

This maximum current reached before the fuse break occurs, together with the rate of decay of the current after the arc gap is reestablished, together with the length of time before the next short circuit occurs determine the average arc current. If the maximum current is high and the rate of decay is slow, the average arc current is high. A high average arc current unduly heats the weld pool making it so molten that in out-of-position welding the metal will flow out of the pool and no weld or an inferior weld results.

The desiderata which determines the rate of rise of the current and the rate of decay are determined primarily by the inductance either internal or supplementary, or both, of the power source. Thus, if the inductance is relatively high, the rate of current rise and decay is relatively low and the average arc current will be relatively high. If the inductance is low, the rate of current rise and decay will be much faster and the average current will be much lower.

These desiderata are easily illustrated by reference to FIGURES 1 and 2 of the drawings which are oscillograms of the currents and voltages plotted against time of a .035 inch electrode advancing at the same constant rate toward a workpiece energized by a constant voltage power source having an open circuit voltage of 18 volts and a short circuit rate of current rise for FIGURE 1 of approximately 70,000 amperes per second and for FIGURE 2 of approximately 100,000 amperes per second.

In FIGURE 1, curves *a* and *b* are the instantaneous voltages and currents respectively. Curves *a* and *b* show that just before the short circuit the arc voltage is approximately 24 volts and the current 100 amperes. This 24 volts is made up of 18 open circuit volts plus 6 inducive volts. At the moment of short circuit, the voltage drops to approximately zero and the arc current rises exponentially to 300–350 amperes in approximately 0.01 second. During this time, due to the increasing resistance of the electrode extension as it heats, the voltage rises to between 4–6 volts. When the fuse break occurs, the arc voltage rises instantaneously to approximately 28 volts, which is the static voltage of the generator at the arc current plus the voltage of self-inductance and thereafter decays exponentially in the next 0.025 second to approximately 24 volts while the current decays exponentially from approximately 300–350 amperes to 100 amperes.

In FIGURE 2, curves *c* and *d* show the voltages and currents respectively, which curves show that just before the short circuit, the voltage and arc current are approximately the same as in FIGURE 1. At the moment of short circuit, the voltage again drops to approximately zero and the current rises exponentially to 450 amperes. When the fuse break occurs, the voltage rises to 28 volts and the current in the next 0.01 second decays from 450 amperes to 80 amperes and the process then repeats itself.

Several fundamental phenomena are evident as a result of a study of these two oscillograms. As the electrodes in both instances are advancing at the same speed, the time required for the newly established end of the electrode to come into contact with the weld pool is an indication of the location of the fuse break. Thus, in FIGURE 1 the relatively long arcing time indicates that the fuse break occurred in the extension, not in the droplet. Also, the relatively high arc current and the relatively long arc period create problems in the control of the weld. Heat is added to the weld puddle during the arc period, and this high average current and long time period make the puddle too hot and, thus, too fluid. Furthermore, the high arc current in the small diameter electrode leads to $I^2R$ heating in the electrode extension and this is conducive to the formation of a much larger droplet on the end of the electrode which only compounds the difficulties when the next short occurs. Thus, with a large droplet the area of contact with the electrode end is larger and the heating due to the short circuit current occurs more readily in the electrode extension than in the droplet. Also, the weld pool has a cooling effect on the droplet and with the larger droplet this cooling effect is greater.

In FIGURE 2 the short circuit current rises to a peak substantially higher than the 300 amperes required to cause the fuse break. This is due to the fact that the fuse break requires a finite time to occur because of the mechanical forces involved and the current, because of the high rate of current rise, considerably overshoots this required amount.

Also, FIGURE 2 shows that because the current decays exponentially from a much higer value than is necessary to cause the fuse break, the average current during the arcing period is still higher than necessary to maintain the arc. This higher average arc current causes problems with the fluidity of the weld pool. It is, of course, possible to reduce the open circuit voltage of the power source so that the arc pops out prior to the occurrence of the next short circuit with a resultant shorter arcing period. This improves the control of the weld pool, but spatter still remains a problem. It will thus be seen that for each welding application it is possible to balance the spatter problem and the heat introduced to the weld pool by appropriately selecting a power source having a rate of current rise which will satisfy the particular conditions of the welding operation. This may also be done by providing a single power source and adjusting its internal inductance or by providing a power source with a high rate of current rise and adding inductance in its output circuit.

Various ways have been proposed in the past to overcome these problems and provide a relatively spatter-free welding operation with proper control of the weld pool temperature.

Patent No. 2,886,696 uses a constant potential power source with an open circuit voltage less than that required to sustain the arc and then adjusts the inductance of the circuit relative to the welding current so that the induced voltage maintains the arc and the number of short circuits occurring each second is in excess of 50 and usually above 100. This method involves careful correlating of the inductance and arc current which sometimes is critical and difficult for the operator in the field to adjust. Also, because the peak short circuit current is high, the average current is necessarily high.

In an effort to reduce this average current, this patent also proposes to either further lower the inductance or the open circuit voltage so that the arc actually goes out between short circuits. This results in an uneven or lumpy weld bead or, even worse, "cold shuts," i.e. where the weld bead is not fully fused to the workpiece.

Patent No. 3,071,680 provides a DC keep alive power source which maintains an arc at a relatively low arc current sufficient to form a molten droplet on the end of the advancing electrode. A supplementary power source in parallel therewith supplies a series of current pulses of a high enough current to cause the molten droplets formed by the keep alive arc to be pinched off and transferred to the weld pool by spray transfer. These pulses are provided at sufficiently close intervals that the molten droplet forming on the end of the electrode never has time to contact the molten weld pool and thus short circuit the keep alive power supply. These pulses tend to overheat the weld pool. Also, transfer of metal to the weld pool is difficult in out-of-position welding.

Patent No. 3,249,735 is somewhat similar to Patent No. 3,071,680 except that in some embodiments an impedance is placed in series with the welding electrode which is then periodically shorted out so as to result in a periodic spray transfer of the weld metal to the weld pool without creating a high enough average current to overheat the weld pool.

In the case of these last two patents, the number of high current pulses is repeated at a fixed frequency, usually either line frequency or a multiple thereof. This is done by making the supplementary power source an alternating current transformer having either half wave or full wave rectification and without using any filtering in the output of the rectifiers.

The invention

The present invention provides a power supply which overcomes all of the above difficulties and others, is relatively cheap to manufacture, and enables the production of high quality welds in downhand or out-of-position welding with a minimum of spatter.

In accordance with the invention, a power supply for automatic welding of the drop transfer type is provided comprised of paralleled principal and suplementary power sources, the principal power source supplying a background or arc current which rises slowly or not at all when the droplet contacts the weld pool and decays slowly when the arc is reestablished. The supplementary power source supplies no or low current during arcing. When the droplet contacts the weld pool, the current rises very rapidly to cause a fuse break. When the fuse break occurs, the current drops immediately to zero. In effect, the supplemental power supply supplies short pulses of current sufficient to, but only long enough to cause a fuse break.

Further in accordance with the invention, the supplemental power source has a maximum short circuit current related to the electrode diameter and to the current being supplied by the principal power source such as to limit the maximum short circuit current to that required to at least cause the fuse break but with the minimum of spatter.

More specifically, in accordance with the invention, a power supply for automatic electric arc welding is provided comprised of a first power source having a constant static voltage output and a short circuit rate of current rise below 60,000 amperes per second, in parallel with a second power source having a short circuit rate of current rise in excess of 60,000 amperes per second, the open circuit voltage of the latter plus its maximum inductive voltage being at least less and preferably several volts less than the open circuit voltage of the former plus its maximum inductive voltage.

Although it is possible to weld with both power sources having a short circuit current rate of rise in the neighborhood of 60,000 amperes per second, the benefits of the invention increase as the differences in the rates of rise increase. In particular, the benefits of the invention increase as the short circuit current rate of rise of the principal source is lowered to be between 40,000 and 15,000 amperes per second and the rate of rise of the supplemental source increases about 100,000 amperes per second.

The relative instantaneous output voltages of the two power sources during welding, and particularly when the arc exists, are important insofar as successful operation of the invention is concerned. These voltages must be such that the supplementary source is supplying the principal amounts of current to the electrode during the time the short circuit exists and a minimum or zero current during the time the arc exists. This voltage relationship may be obtained by relatively adjusting the open circuit voltages of the two power sources taking into account that the instantaneous voltage output of each during the time the arc exists is the open circuit voltage plus the inductive voltage. So long as: the sum of the open circuit voltage and the maximum inductive voltage of the supplementary source is equal to or less than the sum of the open circuit voltage and maximum inductive voltage of the principal source, this condition will prevail.

The maximum inductive voltage of a power source having a short circuit rate of current rise between 15,000 and 40,000 amperes per second is approximately 8–10 volts while that of a power source having a short circuit rate of current rise between 100,000 and 1,000,00 amperes per second is approximately 3 volts. Normally, the open circuit voltage of the supplemental source will be above the open circuit voltage of the principal source and below or equal to its minimum instantaneous output voltage when the arc exists.

Also in accordance with the invention, a method of drop transfer type electric arc welding is provided comprising the steps of continuously energizing the electrode from a principal power source having a relatively low short circuit current rate of rise less than 60,000 amperes per second and during the short circuits when the molten drop contacts the molten weld pool, additionally energizing the electrode from a supplemental power source having a short circuit current rate of rise in excess of 60,000 amperes per second.

Normally in such method, the instantaneous currents supplied by the principal power source will be, for an electrode having a current carrying cross-section in the order of .001 square inch, between 10 and 140 amperes; and for an electrode having a current carrying cross-section of .0031 square inch, between 20 and 180 amperes.

Further in accordance with the method, the maximum instantaneous peak current of the supplemental power source is limited to 350 amperes. Additionally, the principal power source during the times when an arc is present has a maximum instantaneous voltage of between 26 and 29 volts and a minimum instantaneous voltage of between 21 and 24 volts.

A further problem in electric arc welding power supplies has been that a rotating generator capable of supplying a constant potential voltage output with variations in the current has not been adaptable to use for supplying power to a welding operation which requires a variable or drooping voltage as the current increases, such as in stick welding or in submerged arc welding or vice versa. Thus, for the latter, a generator having an open circuit voltage variable between 55 and 100 volts is normally required, whereas for constant potential welding a generator having an open circuit voltage variable between 15 and 55 volts is normally required. To give these characteristics the variable voltage generator has had a series differential winding which opposes the shunt field winding excitation as the current increases to reduce the output voltage. The constant potential generator has had a series cumulative winding which added to the shunt field winding excitation as the current increased to compensate for armature reaction and IR losses in the armature. It would appear possible to take a variable voltage generator capable of delivering the required maximum voltage of 100 volts with the field poles excited to magnetic saturation and then for constant potential output reduce the field excitation for the lower output voltage and provide cumulative series windings. However, in actual practice when a welding generator having a maximum open circuit voltage of 100 volts is operated at reduced shunt field excitation for lower voltage outputs, the shunt field excitation is on the linear portion of the magnetic saturation curve and the design of the series cumulative coils to obtain the desired regulation of the output voltage is almost impossible. This is emphasized when it is realized that a generator designed only for constant voltage output with series cumulative coils does not give a constant voltage output for all adjusted open circuit voltages.

The present invention contemplates an electric arc welding power supply including a rotating generator which can be used selectively for either types of welding operations.

In accordance with this aspect of the invention, a power supply for electric arc welding is provided capable of supplying either variable voltage requirements or constant voltage requirements comprising: a rotating electric generator having an armature, shunt field windings, series differential field windings; and, means for energizing the shunt field windings. The supply has a common output terminal, a constant potential output terminal, and a variable voltage output terminal. One terminal of the generator armature is always connected directly to the common terminal. The other is connected either directly to the constant potential terminal for constant potential output, or in series with the differential series windings to the variable voltage terminal for variable voltage output. The shunt field winding energizing means has a regulated output selectively sensitive to the armature output voltage for constant voltage output and shunt field current for variable voltage output. For constant potential output, no series cumulative field windings are necessary and improved voltage regulation results.

Variable voltage generators excited as heretofore with a DC exciting generator have had an open circuit voltage which changes as the generator heats during use. Thus, as the shunt field coils of the main generator heat, their resistance increases requiring more voltage across the field coils to maintain the same open circuit voltage. However, as the exciting generator temperature increases, its voltage output decreases, i.e. changes in a direction opposite to that which is needed to correct for heating of the main generator. Heretofore, the welding operator has had to constantly readjust his open circuit voltage as his generator heated so as to maintain the same welding conditions. The present invention maintains the shunt field winding current constant with heating, line voltage variations, or otherwise, so that the open circuit voltage remains substantially constant with time and temperature.

Objects of invention

The principal object of the invention is the provision of a new and improved power supply for electric arc welding of the drop transfer type which enables improved welds to be readily obtained in either the downhand or out-of-position welding and thin sheet metal.

A further object of the invention is the provision of a new and improved power supply for electric arc welding of the drop transfer type which has less spatter than heretofore.

Another object of the invention is the provision of a new and improved power supply for electric arc welding of the drop transfer type which enables the average welding current to be maintained at lower values than heretofore while still obtaining satisfactory welds.

Still another object of the invention is the provision of a new and improved power supply for electric arc welding of the drop transfer type which enables maintaining a lower weld pool temperature.

Still another object of the invention is the provision of a new and improved power supply for electric arc welding of the drop transfer type including two power sources, one which supplies the current during the existence of the arc and a second which supplies a pulse of current when the droplet contacts the weld pool.

Still another object of the invention is the provision of a new and improved power supply for electric arc welding which has improved arc starting capabilities.

Still another object of the invention is the provision of a new and improved power supply for electric arc welding wherein when the arc is initially started, the power supply provides a high initial pulse of current to rapidly establish an arc gap at the point of contact with the workpiece.

Still another object of the invention is the provision of a new and improved power supply for electric arc welding comprised of two power sources, one of which provides the current during the arcing and the other of which automatically provides a pulse of current when the electrode end contacts the weld pool.

Another object of the invention is a constant potential generator which does not require series cumulative field windings.

Another object of the invention is a welding power supply which enables welding to be carried out using a lower average arc current but which quickly reestablishes the arc when the droplet shorts to the weld pool.

Another object is a welding power supply made up of two power sources having internal inductances and open circuit voltages so interrelated that they are automatically switched on to supply current as the arc conditions instantaneously change.

Another object of the invention is the provision of a new and improved method of arc welding of the drop transfer type wherein one power source supplies a generally constant current during both the periods of arcing and short circuits but when the short circuit occurs, a second power supply supplies a pulse of current sufficient to break the short circuit quickly and reestablish the arc.

Still another object of the invention is a new and improved power supply for electric arc welding wherein the same rotating generator may be interchangeably used for electric arc welding requiring either variable voltage output characteristics or constant potential output characteristics.

Another object of the invention is to provide a rotating welding generator wherein its open circuit voltage remains substantially constant as the generator heats while in use.

The invention may take physical form in certain parts and arrangement of parts, preferred embodiments of which will be described in detail in this specification and illustrated in the accompanying drawings which form a part hereof and wherein:

FIGURES 1 and 2, previously referred to, are voltage and current oscillograms on a greatly enlarged time base of drop transfer type electric arc welding showing the instantaneous currents and voltages when using a power supply having a short circuit rate of current rise of 70,000 amperes per second and 100,000 amperes per second, respectively;

FIGURE 3 is an oscillogram similar to those of FIGURES 1 and 2 showing the instantaneous current and voltages using the present invention;

FIGURE 4 is a diagram somewhat schematic of a power supply illustrating a preferred embodiment of the invention; and, FIGURE 5 is a static volt ampere curve of the primary and supplemental power sources.

Preferred embodiment

Referring now to the drawings wherein the showings are for the purpose of illustrating a preferred embodiment of the invention only and not for the purposes of limiting same, FIGURE 4 shows a first or primary power source G, a second or supplementary power source S, both connected to supply electric current between an electrode E and a workpiece W. The electrode E is a wire of indeterminate length and is fed towards the workpiece W by a pair of conventional feed rolls 10, driven as is conventional by an electric motor M. The electrode E moves past sliding contacts 11 spaced a distance D from the workpiece W and an arc X is maintained between the end of the electrode E and the workpiece W, which arc both melts off the end of the electrode E and melts a weld pool P on the surface of the workpiece W. The workpiece W is shown as having its upper surface horizontal and the electrode E is shown as advancing in a perpendicular direction. Obviously, the electrode E may have any desired angle relative to the surface of the workpiece and the surface of the workpiece may have any desired angle relative to horizontal.

The distance D will in automatic welding be fixed and in semi-automatic arc welding will usually be maintained as accurately as the welding operator can maintain this distance. The distance D in practice will vary from ¼ inch to ¾ inch, although it can be greater.

The electrode E may be of any desired metal, e.g. aluminum, stainless steel, high alloy steel, but in the preferred embodiment is low carbon steel. The current carrying cross section may be as desired .0005 sq. in. to .005 sq. in. but preferably in the order of .001 sq. in. The voltages, currents, and dimensions set forth herein are all in relation to the preferred embodiment.

The motor M is energized as is conventional from a suitable power source, preferably of constant voltage, through a variable impedance 15 so that its speed of rotation can be readily varied but once set will remain constant. Obviously, the speed of the motor can be made to vary proportionally to the average voltage across the arc gap X or in some instances in proportion to the average current in the arc gap X, as is disclosed in an application of Theodore Ashton et al., Ser. No. 678,094, filed Oct. 25, 1967.

The first power source G has one terminal 20 connected to workpiece W through conductor 21, terminal CT and power lead 24 and a second terminal 22 connected to the welding electrode E through conductor 12, diode 13, wire 14, terminal CP and power lead 15'. Terminal 22 also connects through series differential windings 25 to wire 26 to terminal VV which will be referred to herein often.

The power source G in a preferred embodiment and in accordance with the invention, has an output circuit voltage adjustable preferably between 15 and 55 volts, which voltage remains substantially constant at any adjusted value with variations in the steady state current in the output. Additionally, the power source G has sufficient inductance, internal or external or both, as to have a short circuit rate of current rise below 60,000 and preferably between 15,000 and 40,000 amperes per second.

The power source G may take any one of a number of different forms, e.g. batteries plus an inductance, rectified alternating current plus an inductance or direct current from a rotating generator having sufficient internal inductance or having an external inductance or both. A rotating DC generator is preferred wherein the armature reactance and internal inductance is such as to give the desired rate of short circuit current rise.

It is to be noted that in conventional constant potential welding used heretofore the maximum open circuit voltage of a rotating direct current generator has been on the order of 30 volts. Such a generator normally has a short circuit rate of current rise in excess of 70,000 amperes per second which is too high for use as the first or primary power source with the present invention. It is preferred, therefore, to use a rotating current generator having a maximum open circuit voltage with full field excitation on the order of 90 volts and to excite the field only in an amount sufficient to provide the desired output voltage.

In the preferred embodiment, the power source G is a standard SAE 400 motor-driven generator manufactured by the assignee of this application and having consequent pole shunt excitation capable of an open circuit voltage greater than 90 volts when excited to a saturation factor of 1.3. Such a generator when operated at 15–55 volts open circuit has a rate of rise of short circuit current between 15,000 and 40,000 amperes per second. Such a generator operates on the linear portion of the saturation curve and flat compounding to provide constant potential output is virtually impossible. Thus, means are provided for adjusting the field excitation proportional to the average output voltage so as to hold the average output voltage constant. In the embodiment shown, a voltage regulator R is provided energized from an AC power source 19 and having sensing terminals 31 connected through the CV position of a two-pole double throw switch 34 to terminal 20, and through the CP position of a switch 50' to terminal 22 of the generator G. The regulator R has output terminals 32 connected to the field pole windings 33 of the power source G. The regulator R has a pointed control member 35 and voltage calibrated dial 36 adjusting its output and thus the output voltage of the generator G. The regulator R includes electronic amplifying means and has the capability of sensing the average output voltage of the power source G and regulating the current in the field windings 33 so as to maintain this average voltage substantially constant at any preset value despite changes in the average output current of the power source G. The regulator R is insensitive to the instantaneous voltage changes. The exact circuit diagram of the regulator R forms no part of the present invention and will not be described further herein. A preferred regulator is described in application, Ser. No. 733,497, filed May 31, 1968.

The supplementary power source C can be any source of direct current having the required short circuit rate of current rise such as a battery which has a minimum of internal inductance, a DC generator having a low internal inductance, an alternating current transformer, the output of which is rectified, or an alternator, the output of which is rectified. In the event of a transformer or alternator, full wave rectification should be used and preferably the AC should be multiphase. In the event single phase alternating current is used, some means, either artificial or natural, must be provided to prevent the voltage from falling to zero. Artificial filtering cannot contain inductance. Otherwise, the rate of rise of the current might be adversely affected. Thus, it is preferred to use polyphase transformers or alternators as a source of AC and in the preferred embodiment the power source S includes a polyphase alternator A having a rotor mounted on the same shaft as the rotor of the power source G and field coils mounted in the same housing. The alternator A has three output terminals 35', 36', 37' connected by wires 38, 39, 40 to the input terminals of six diodes 41 connected in a conventional bridge rectifier circuit and having an output terminal 42 connected to the wire 21 and thus the workpiece W and a second output terminal 43 connected to the wire 14 and thus to the electrode E. The polarity of the output of the bridge rectifier is the same as the polarity of the generator G. When not welding the diode 13 prevents current from the source S circulating through source G when source G has an open circuit voltage less than that of source S. In some instances the diode 13 can be replaced by a switch which is closed only during welding. In some instances, this results in a slight circulating current from the supplemental source through the principal source but this is not detrimental. In fact, it stabilizes the supplemental source by placing a constant load thereon.

FIGURE 5 shows the volt and ampere relationships of both power sources. Thus, curve 50 indicates the maximum open circuit voltage of the power source G if the field is fully excited and the power supply is connected for variable voltage output. Curves 51 and 52 are the lower and upper voltage lights of the power source G provided by appropriate adjustment of the regulator R when the power supply is connected for constant potential output. The lower voltage is 15 volts and the upper voltage 55 volts, and the curves 51, 52 are generally horizontal throughout the current rating of the power source G. Point 53 indicates a typical open circuit voltage of 18 volts. Point 54 indicates the average voltage shown on a d'Arsonval type meter during welding when the power source G is set to have an open circuit voltage of 18, it being noted that the point 54 is approximately one volt higher than the curve 53. Point 55 shows the average instantaneous voltage during the period when the arc exists.

Curve 56 of FIGURE 5 shows the static volt ampere curve output of the supplementary power source, it being noted that the voltage is substantially constant until the current approaches the maximum rating of 350 amperes, at which time the voltage begins to drop off and as loading on the supplementary power source further increases, the current thereafter decreases. Obtaining such a volt ampere curve with an alternator is conventional in the art and the design of the alternator will not be explained further hereinafter.

For best and most economical results with drop transfer welding, the relationship between the open circuit voltage of the principal power source and the supplementary power source is important, as well as the relationship between the open circuit voltage of the supplementary power source and the voltage across the arc gap during the periods of time that an arc exists. Thus, the open circuit voltage of the principal source is always less than that of the supplementary source and the open circuit voltage of the supplementary source is always less than the maximum instantaneous voltage across the arc during the time that an arc exists which maximum voltage is always greater than the open circuit voltage of the principal source because of the "inductive volts."

In accordance with the preferred embodiment, the open circuit voltage of the supplementary power source is 23 volts. This may be varied up or down slightly but it has been found that this is an ideal voltage. A higher voltage gives a fluffy arc. The open circuit voltage of the principal source may be varied as heretofore stated between 15 to 23 volts, and in most welding operations is adjusted to approximately 18 volts.

FIGURE 3 is an oscillogram showing the results obtainable using the present invention. Thus, curve *e* shows the instantaneous arc voltage; curve *f* shows the current supplied by the supplemental power source; curve *g* shows the current supplied by the first or primary source; and curve *h* shows the total current supplied to the electrode. These curves show that just prior to the short circuit, the arc voltage is approximately 22 volts, the current in the supplemental power source is zero (approximately zero), the current in the primary power source and the total current is approximately 80 amperes. When the short circuit occurs, the current in the supplementary power source rises in approximately 0.0020 second to a value of 250 amperes; the current in the same length of time in the primary power source rises from 80 to 120 amperes, and, the total current rises from 80 amperes to 370 amperes. When the fuse break occurs at the end of 0.0020 second and the arc is reestablished, the current in the supplemental power source is shutoff while the current in the primary source falls exponentially from 120 amperes to 80 amperes in approximately 0.012 second. The average current during the time the arc exists is approximately 100 amperes.

Thus, the principal source furnishes a generally constant current because of its high inductance while the supplementary source furnishes a high, but limited, current sufficient to cause the fuse break to occur very quickly. This latter current flow is limited in duration only by the time required to cause the fuse break and is accurately called a current pulse.

Switching the supplemental power source on and off so as to supply this current pulse takes place automatically. It is switched on when the short circuit occurs and the voltage at the electrode falls below the source S output voltage. It is switched off when the arc is reestablished because at this instant, the instantaneous voltage of the principal source instantaneously rises above the supplemental source instantaneous voltage. It is to be emphasized, however, that no physical switch is required. The alternator A having essentially no inductance in its circuit has a maximum open circuit voltage of 23 volts which is less than the arc voltage so that it furnishes no current during arc time. During the shorted period, the principal generator has so much inductance its current increases only a slight amount whereas the supplementary source having no inductance furnishes current to its limited capacity.

Comparing the oscillograms of FIGURE 3 with those of FIGURES 1 and 2, it is to be noted that the short circuit frequency of FIGURE 3 is at the rate of about one every 0.016 second, i.e., 60 per second, which is substantially more frequently those those shown in FIGURE 1 and approximately the same as those shown in FIGURE 2. Additionally in FIGURE 3, the ratio of the short circuit to the time of one cycle is 1 to 8 whereas in the example of FIGURE 1, the ratio is approximately 1 to 3.5 and in FIGURE 2 the ratio is approximately 1 to 3.

Further, the short circuit period of FIGURE 3 is less than the short circuit period of FIGURE 2 although it can be made to be the same. Also, the maximum short circuit current of FIGURE 3 does not exceed 350 amperes, thus limiting the spatter at the time of the fuse break. The arcing time is as long as or longer than that of FIGURE 2. Furthermore, the current during the principal portion of the arcing period is substantially constant and not the result of an exponential decline from the peak current of 370 amperes. It is of further interest to note that the frequency of the short circuit is not a fixed frequency as is the case with the prior art where two power sources are employed, one being pulsed at a fixed frequency but instead is a natural frequency determined by the number of times that the molten droplet shorts the electrode to the weld pool.

By choosing the relative voltages of the principal and supplemental power sources, the level of the background or constant current in the arc as supplied by the principal power source can be chosen as well as the level of contribution to the weld by the supplemental power source.

The advantages of such a welding system become evident where particularly critical welds are to be made. For example, when welding on thin gauge material, the control of heat during the arcing period is possible by means of controlling the level of the background current from the principal power source. Presently used power sources must either accept the high average level of background current due to the exponential decay of the current, or force an interruption of the arc current by lowering the inductance of the power source so that the arc actually goes out between short circuits. Under less critical conditions, a reduction of spatter, as well as an optimum balance of heat can be obtained for increased welding speeds.

The present invention is also of value in starting the arc. Thus, before the arc is started, the primary power source has an open circuit voltage of 18 and the supplementary power source has an open circuit voltage of 23. At the moment the advancing cold electrode touches the workpiece the point of highest resistance is at the point of contact. Because the electrode is constantly advancing, this resitsance will drop rapidly as it is pressed against the workpiece. The current from the supplementary power source rises at a rate in excess of 200,000 amperes per second to a value high enough and in a sufficiently brief period of time that before the electrode has had a chance to advance an appreciable distance toward the workpiece, the current is high enough to cause the fuse break at the point of greatest resistance namely, the point of contact. Once the arc gap is established, the voltages and currents quickly reach the values shown in FIGURE 3.

The power supply illustrated is readily usable for welding operations requiring variarble (or drooping) voltage output by simply connecting the power lead 15 to the terminal VV rather than terminal CP such that the welding current now flows through the series differential field winding 25. Additionally, the switch 35 is shifted to the VV positions shown such as to connect the sensing terminals 31 of the voltage regulator R across a resistor 36 in series with the field windings 33. The control member 35 is then adjusted so that the current flowing in the field windings will provide the desired open circuit voltage. When the generator is supplying a variable voltage, the supplemental power source is completely inactive.

It is to be noted that with this ararngement the generator G will supply substantially the same open circuit voltage regardless of line voltage variations or internal variations in the generator G due to heating or the like.

Alternatively for some welding processes, as is described in the application of Theodore Ashton et al., Ser. No. 678,094, filed Oct. 25, 1967 the sensing terminals 31 may be connected across terminals VV and CT by placing switch 34 in the CV position and switch 50' in the VVCP position. The generator G when so connected has the dynamic characteristics of a variable voltage generator but with a constant static voltage output with static current variations. With this arrangement the static output voltage may be preset by the knob 35 and calibrated dial 36 to any desired value and maintained at this level during welding.

Inductance as used herein, unless otherwise stated, means the total inductance of the power source either external or internal plus the inductance of the power leads to the electrode.

Open circuit voltage is the voltage delivered by a power source when not delivering current.

Instantaneous voltage is that voltage across the arc which would be read on an oscilloscope or the oscillograph of a high speed recorder with a greatly expanded time base. This instantaneous voltage is made up of the open circuit voltage of the power source plus the inductive voltage, which latter voltage, of course, varies during the time an arc exists.

Average voltage is that which would be read on an electric meter, e.g. of the d'Arsonval type, incapable of following the rapid pulsations in the voltage caused by the alternate short circuits and arc periods.

Instantaneous current is that which would be read on an oscilloscope or the oscillograph of a high speed recorder having a greatly expanded time base. Average current is that which would be read on an electric ammeter incapable of following the rapid pulsations of the current in each cycle.

Static volts and amperes are those voltages and amperes as indicated by electric meters incapable of following rapid voltage or current fluctuations and wherein the current is varied at a rate slow enough that there are no measurable inductive volts generated.

By short circuit rate of current rise is meant the slope of the portion of the current curve at the instant that a short circuit is imposed across the terminals of a power source having an open circuit voltage of 30 volts or the maximum static open circuit voltage if it is less than 30 volts, it being appreciated that this curve is exponential in shape and its slope decreases with time from the instant of the imposing of the short circuit. For practical purposes the rise in current for the first .001 second multiplied by 1000 will be close enough. Thus, a generator having a short circuit rate of current rise of 100,000 amperes per second will rise 100 amperes in 0.001 second, although at the end of .003 second, the current will only be 250 amperes. It is further to be noted that the maximum current, if the short circuit is maintained for a prolonged period of time, is the maximum current rating of the power source.

When the cross sectional area of an electrode is given, it is intended to include a solid wire or the current carrying section of a tubular electrode.

Using the present invention, improved starting characteristics of the arc have been readily obtained. Once the arc is started, the welding proceeds smoothly with a minimum spatter and the weld pool temperature remains sufficiently low that out-of-position welding and, in particular, overhead welding is readily done.

The invention has been described with reference to a preferred embodiment.

Having thus described our invention, we claim:

1. A universal power supply for electric arc welding having output terminals including:

(A) a rotating generator having an armature, shunt field coil windings, and series differential windings;

(B) a shunt field coil winding energizing means including a regulator having output terminals connected to said field coil windings and sensing terminals selectively connectable to sense either the armature output voltage or to the current flowing in the shunt field windings and maintain either constant at a preset value;

(C) a second D.C. power source having output terminals; and, (D) means selectively connecting said second power source and said generator armature in parallel and to said output terminals or said armature to said output terminals in series with said series differential windings.

2. The power supply of claim 1 wherein said second D.C. power source is a transformer and rectifier combination.

3. The power supply of claim 1 wherein said second D.C. power source is a multiphase alternator and rectifier combination.

4. A universal power supply for electric arc welding comprising in combination:

(A) a common output terminal, a constant potential output terminal, and a variable voltage output terminal;

(B) a first power source comprising a rotating generator having an armature, shunt field coil windings and series differential windings, said armature having one terminal connected directly to the common terminal and a second terminal connected directly to the constant potential terminal, said second terminal being connected also through the series differential windings to the variable voltage terminal;

(C) field coil winding energizing means including a regulator having output terminals connected to said field coil windings and sensing terminals selectively connectable to sense either the armature output voltage or to the shunt field winding current;

(D) a second D.C. power source having output terminals which are connected one to the common terminal and one to the constant potential terminal.

5. The power supply of claim 4 wherein said second D.C. power source is a transformer and rectifier combination.

6. The power supply of claim 4 wherein said second D.C. power source is a multiphase alternator and rectifier combination.

7. The power supply of claim 1 wherein said generator has a short circuit current rate of rise less than 60,000 amperes per second and said second D.C. power source has a short circuit current rate of rise greater than 60,000 amperes per second.

8. The power supply of claim 4 wherein said generator has a short circuit current rate of rise less than 60,000 amperes per second and said second D.C. power source has a short circuit current rate of rise greater than 60,000 amperes per second.

9. The power supply of claim 7 wherein said second power source has a short circuit current rate of rise greater than 100,000 amperes per second.

10. The power supply of claim 8 wherein said second power source has a short circuit current rate of rise greater than 100,000 amperes per second.

References Cited

UNITED STATES PATENTS

| | | | |
|---|---|---|---|
| 2,867,730 | 1/1959 | Welch | 307—43 X |
| 3,231,751 | 1/1966 | Bates | 307—52 |

ROBERT K. SCHAEFER, Primary Examiner

H. J. HOHAUSER, Assistant Examiner

U.S. Cl. X.R.

219—131; 322—64